United States Patent
Huang

[19]

[11] Patent Number: 5,890,972
[45] Date of Patent: Apr. 6, 1999

[54] SPIRAL PROTRUSION TYPE HANDLE GRIP

[76] Inventor: Ben Huang, 19472 Woodlands La., Huntington Beach, Calif. 92648

[21] Appl. No.: 869,016

[22] Filed: Jun. 4, 1997

Related U.S. Application Data

[63] Continuation-in-part of Ser. No. 632,578, Apr. 15, 1996, Pat. No. 5,671,923, which is a continuation-in-part of Ser. No. 507,575, Jul. 26, 1995, Pat. No. 5,584,482, which is a continuation-in-part of Ser. No. 595,445, Feb. 26, 1996, abandoned, which is a continuation-in-part of Ser. No. 58,313, May 3, 1993, which is a continuation-in-part of Ser. No. 953,190, Sep. 29, 1992, abandoned, which is a continuation-in-part of Ser. No. 890,383, May 26, 1992, abandoned, which is a continuation-in-part of Ser. No. 637,931, Jan. 14, 1991, abandoned, and a continuation-in-part of Ser. No. 787,823, Jan. 23, 1997, Pat. No. 5,730,669.

[51] Int. Cl.$^6$ .............................. A63B 53/14; A63B 49/08
[52] U.S. Cl. ............................................. 473/302; 473/551
[58] Field of Search ........................................ 473/300, 301, 473/302, 303, 549, 551

[56] References Cited

U.S. PATENT DOCUMENTS

| 2,200,626 | 5/1940 | Lamkin | 473/302 X |
| 4,347,280 | 8/1982 | Lau et al. | 473/549 X |
| 4,567,091 | 1/1986 | Spector | 473/549 X |
| 5,624,116 | 4/1997 | Yeh | 473/302 X |

*Primary Examiner*—William E. Stoll
*Attorney, Agent, or Firm*—Fulwider Patton Lee & Utecht, LLP

[57] ABSTRACT

A shock absorbing grip for a golf club having a strip formed of a polyurethane layer bonded to a felt layer. The strip is spirally wrapped about the golf club handle with the side edges being in adjoining relationship. Stitching extends from the underside of the felt layer over the outer surface of the polyurethane layer to tighten the portion of the polyurethane layer between the stitching to define a slip-inhibiting protrusion that forms a spiral protrusion along the length of the completed grip.

32 Claims, 8 Drawing Sheets

SPIRAL PROTRUSION TYPE HANDLE GRIP

This application is a continuation-in-part of Ser. No. 08/632,578 filed on Apr. 15, 1996, now U.S. Pat. No. 5,671,923 which was a Continuation-In-Part of Ser. No. 08/507,575 filed on Jul. 26, 1995, now U.S. Pat. No. 5,584,482 which is a Continuation-In-Part of Ser. No. 08/595,445 filed on Feb. 26, 1996, now abandoned, which is a Continuation-In-Part of Ser. No. 08/058,313 filed on May 3, 1993, pending, which is a Continuation-In-Part of Ser. No. 07/953,190 filed on Sep. 29, 1992, now abandoned, which was a Continuation-In-Part of Ser. No. 07/890,383 filed on May 26, 1992, now abandoned, which is a Continuation-In-Part of Ser. No. 07/637,931 filed on Jan. 14, 1991, now abandoned, and this application is also a Continuation-In-Part of Ser. No. 08/787,823, filed Jan. 23, 1997, now U.S. Pat. No. 5,730,669.

BACKGROUND OF THE INVENTION

The present invention relates to an improved grip for golf clubs, tennis racquets, baseball bats and other sporting equipment employing handles subject to shock when such devices are impacted by a ball.

It is well known that shock generated by impact between a golf club and a golf ball or a tennis racquet and a tennis ball can adversely affect muscle tissue and arm joints, such as elbow joints. The energy generated by such impact is usually of high frequency and short duration with rapid decay, and which is often known as "impact shock." Tight grasping of a golf club grip or tennis racquet grip to keep it from slipping in a user's hands contributes to such impact shock.

Applicant has previously developed resilient grips which successfully reduce or substantially eliminate impact shock to the muscle and arm joints of the users of golf clubs and the like. See, for example, U.S. Pat. No. 5,374,059 granted to applicant Dec. 20, 1994, and U.S. Pat. No. 5,584,482 granted to applicant Dec. 17, 1996. Such earlier grips utilize a polyurethane layer bonded to a felt layer to define a strip which is spirally wrapped around the handle of a golf club, tennis racquet or baseball bat to conform generally to the external configuration of such handle. In earlier grips of applicant's design, the thickness of the polyurethane layer relative to the thickness of the felt layer as compared to prior art resilient grips was a minimum of approximately 0.18, with the thickness of the polyurethane layer being about equal to or thicker than the thickness of the felt layer in a typical grip of my design. Also, in some of such earlier grips, the side edges of the polyurethane-felt strip tended to unravel in use, and where the strip was not properly applied to a golf club handle, the grip would tend to loosen relative to the handle, particularly, when a golf club was withdrawn from a golf club bag. To overcome these disadvantages, my later grip designs utilize heat-compressed radially inwardly extending reinforcement side edges formed in the polyurethane layer along the length of the strip. The recessed side edges also enhance the frictional grip of a user's hands on the golf club or tennis racquet. Although my prior grips provide generally satisfactory results, under humid or rainy conditions slippage of a user's hands on the grip can occur with a result in diminished control of the golf club or tennis racquet. To counter such slippage the user must exert considerable gripping pressure on the grip.

SUMMARY OF THE INVENTION

Applicant has discovered that polyurethane-felt grips of the aforedescribed nature can be made more resistant to slippage where a raised spiral profile is formed along the length of the strip when the strip is spirally wrapped about the handle of a golf club, tennis racquet or the like. The raised spiral protrusion increases the surface area of the grip in contact with the user's hands and permits the user to maintain firm hand contact with the grip even under rainy, humid conditions, or where the user's hands are moist from perspiration. The user can therefor continue playing even during humid or rainy conditions and even where the user's hands are perspiring. Such improved grip utilizes applicant's previously developed concept of bonded-together layers of polyurethane and felt wherein the ratio of the thickness to the thickness of the felt layer is a minimum of approximately 0.18. The improved grip of the present invention preferably utilizes heat-compressed sidewardly and outwardly curved reinforcement side edges along its length. The strip is spirally wrapped about a golf club or tennis racquet handle with the reinforcement side edges either in abutment or overlapped. The raised spiral protrusion is formed by stitching extending from the underside of the felt layer over the outer surface of the polyurethane layer to tighten and thereby raise the portion of the strip between such stitching.

The polyurethane-felt strip of the present invention may be spirally wrapped about a tapered resilient sleeve that has been applied to the handle of a golf club shaft. Alternatively, the strip may be spirally wrapped about the bare handle of a golf club or tennis racquet. The polyurethane-felt strip may also be spirally wrapped about a tapered sleeve while the sleeve is positioned on a collapsible mandrel to provide a slip-on golf club grip that can be applied to a new golf club or can be utilized as a replacement golf grip.

The grip of the present invention has been found to greatly cushion the shock transferred from a golf club to a golfer's body or from a tennis racquet to the arm of a tennis player, thereby preventing the danger of injury to a user of the grip. The grip can also provide a long service life, may be manufactured at a low cost, and can be readily installed by a user.

While grips formed with spiral protrusions have been heretofore proposed, such grips were not fabricated from my unique polyurethane-felt material wherein the ratio of the thickness of the polyurethane layer is equal to or larger than approximately 0.18 as described in my patent application Ser. No. 08/550,219, now U.S. Pat. No. 5,695,418 having an effective filing date of Jan. 14, 1991. Also, such heretofore proposed grips did not incorporate the unique features described hereinabove.

These and other features and advantages of the present invention will become apparent from the following detailed description, when taken in conjunction with the accompanying drawings.

DETAILED DESCRIPTION OF PREFERRED EMBODIMENTS

Figure 9:
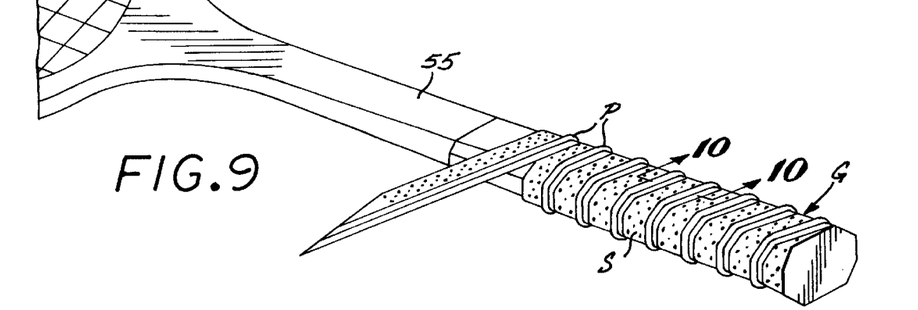
FIG. 9 is a broken perspective view of a grip embodying the present invention being spirally wrapped about a tennis racquet handle.
Figure 15:
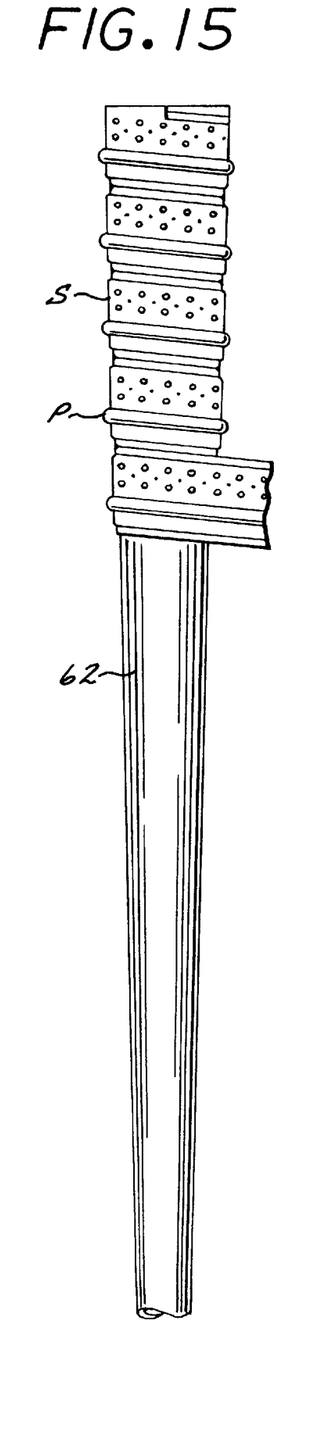
FIG. 15 is a side elevational view showing a strip embodying the present invention being wrapped around the bare handle of a golf club shaft.

Referring to the drawings a grip G embodying the present invention utilizes an elongated resilient strip S which is spirally wrapped about the handle portion of a tennis racquet as shown in FIG. 9 or the handle of a golf club shaft as shown in FIG. 15. The strip S includes an open-pored felt layer generally designated 30 having an inner or bottom surface 32 which is suitably adhered to a racquet handle, a tapered resilient sleeve or directly to a bare handle of a golf club shaft. Strip S also includes a smooth closed pore polyurethane layer, generally designated 34, which is bonded to the felt layer 30. The bonded-together polyurethane and felt layers are configured as the unitary strip S.

Figure 11:
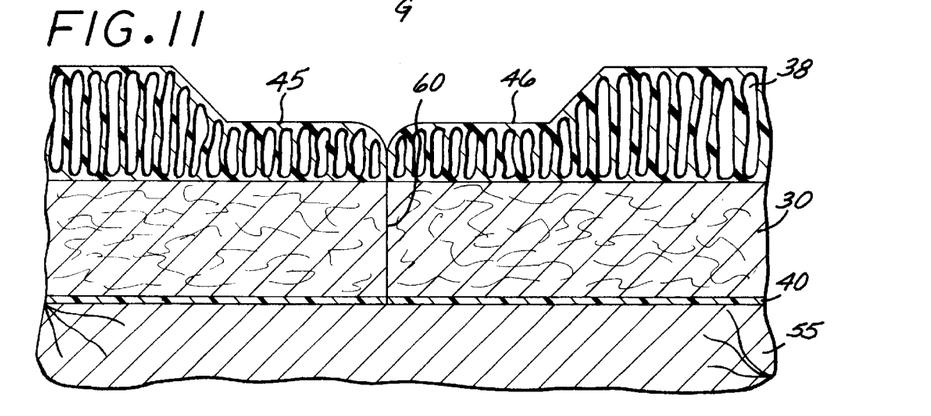
FIG. 11 is an enlarged view of the encircled area designated 11 in FIG. 10.

More particularly, the felt layer 30 is formed of a suitable open-pored material and has its upper or outer surface bonded to the lower surface 36 of the polyurethane layer 34 As indicated in FIG. 11, the polyurethane layer is formed with pores 38 which extend vertically, i.e. generally normal to the longitudinal axis of the strip S and racquet handle or golf club shaft handle when the grip has been affixed to such handle. The polyurethane layer 34 may be formed in a conventional manner by coating one side of a felt strip with a solution of polyurethane (e.g. polyester or polyether) dissolved in a dimethyl formamide (DMF), immersing the coated strip in water baths to displace the DMF and cause the urethanes to coagulate, and finally driving off the water by the application of pressure and heat. In this manner, the pores 38 will extend perpendicularly relative to the longitudinal axis of the strip, while the underside of the polyurethane layer is bonded to the upper surface of the felt strip. As noted hereinbefore, applicant has discovered that greatly improved shock absorbing qualities may be obtained in a racquet or golf club grip where the thickness of the polyurethane layer to the thickness of the felt layer is increased over the thickness of the felt layer employed in prior art grips. More specifically, applicant considers that the ratio of the thickness of the polyurethane layer to the felt layer should be a minimum of approximately 0.18. In the embodiment shown in the drawings, the thickness of the polyurethane layer is preferably about 0.4 millimeters and the thickness of the felt layer in about 0.9 millimeters. Excellent results have been obtained with this ratio.

Figure 5:
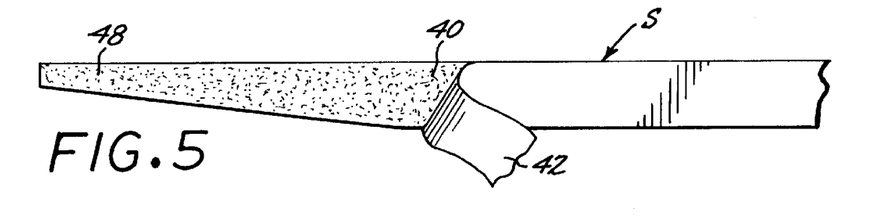
FIG. 5 is a broken view of the underside of the starting end of the strip.
Figure 6:
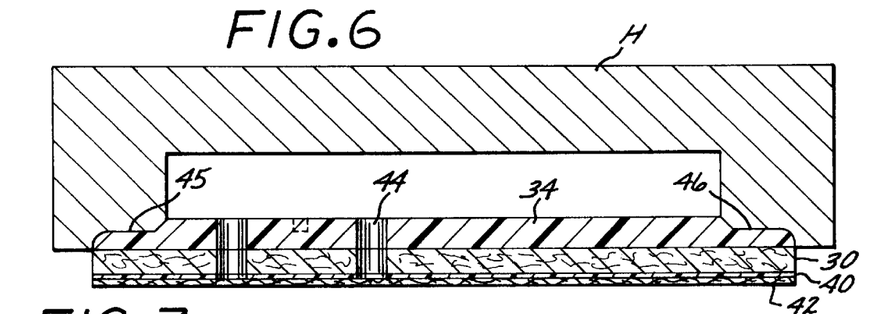
FIG. 6 is a vertical sectional view taken in enlarged scale along line 6—6 of FIG. 2.

The polyurethane layer 34 provides a cushioned grasp of the player's hand on a handle tennis or golf club and also enhances the player's grip by providing increased tackiness between the player's hand and the grip. The felt layer provides strength to the polyurethane layer and serves as a means for attaching the bonded-together polyurethane and felt strip to a handle. As shown in FIGS. 5 and 6, the underside 32 of the felt layer is provided with a conventional adhesive material 40 which covers the underside of the felt layer. The underside of the adhesive material 40 is originally covered with a protective quick-release tape 42 The polyurethane and felt layers may be formed with vertically extending perforations 44 which enhance the absorption rate of moisture from a user's hand.

Figure 1:
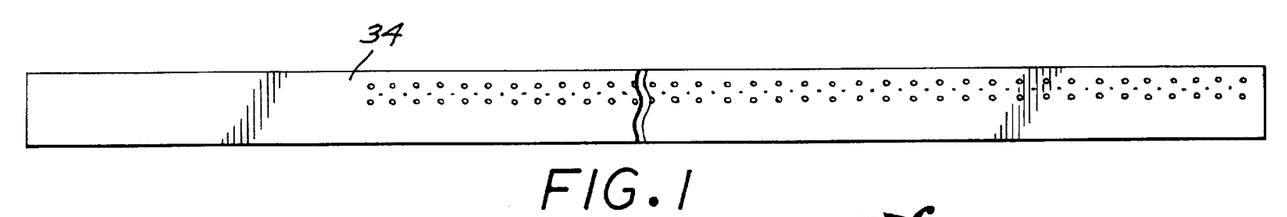
FIG. 1 is a top plan view of a polyurethane-felt strip before it is fabricated into a grip embodying the present invention.
Figure 2:
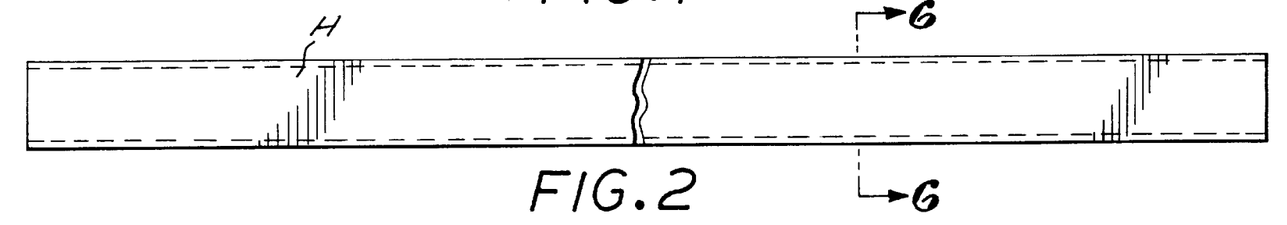
FIG. 2 is a top plan view of a heated platen utilized to form heat-compressed reinforcing side edges on the strip of FIG. 1.
Figure 3:
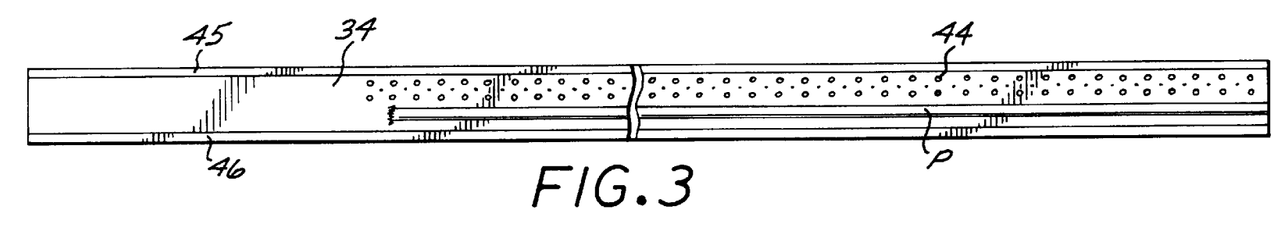
FIG. 3 is a top plan view of the strip after the reinforcing side edges have been formed and stitching has been applied to the strip to define a slip-inhibiting protrusion.
Figure 4:
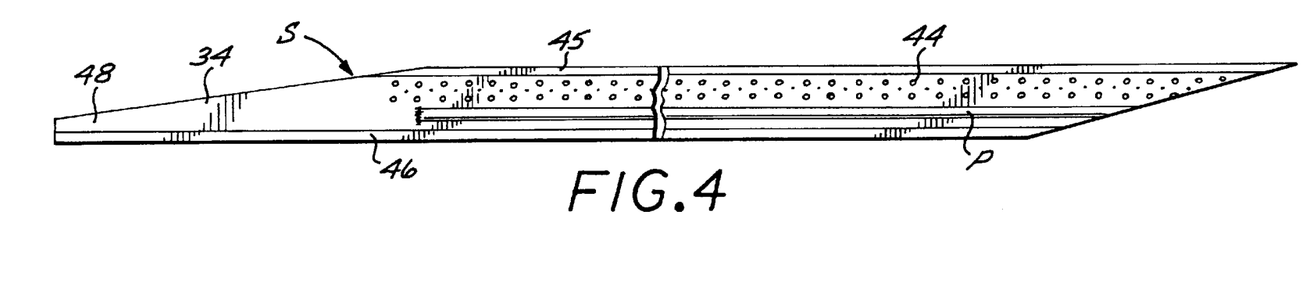
FIG. 4 is a top plan view of the strip of FIG. 3 after leading and trailing edges have been formed thereon.

Referring now particularly to FIGS. 1–6, FIG. 1 is top plan view of a length of polyurethane-felt strip material before it has been fabricated into its final configuration of the strip S. FIG. 2 is a top plan view of a heated platen H shown in FIG. 6 being pressed onto the strip material of FIG. 1 to form reinforcing side edges along the length of the strip material. In FIGS. 3 and 4 stitching generally, designated T, has been applied to the strip to form a slip-inhibiting protrusion, generally designated P. FIG. 5 is a broken view of the underside of the staring end 48 of strip S showing adhesive 40 which is initially covered by a conventional pull-off quick release tape 42.

Figure 7:
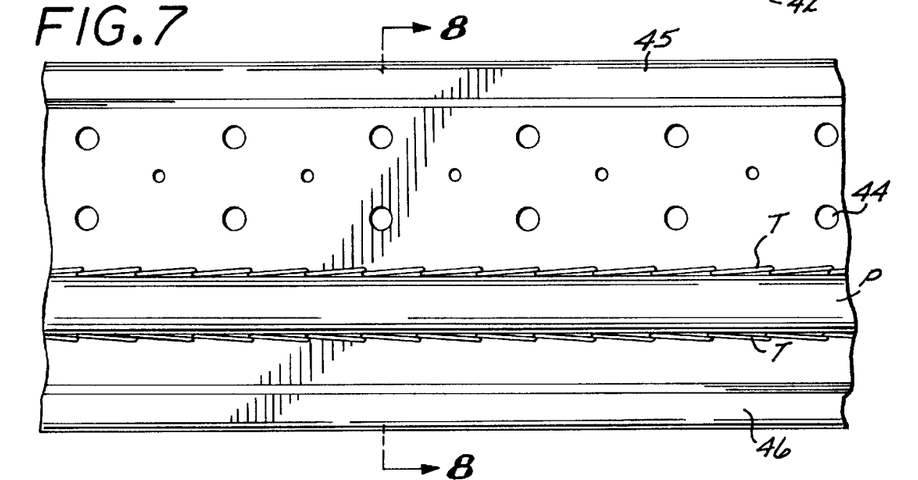
FIG. 7 is a broken top plan view of the strip of FIG. 4 in enlarged scale.
Figure 8:
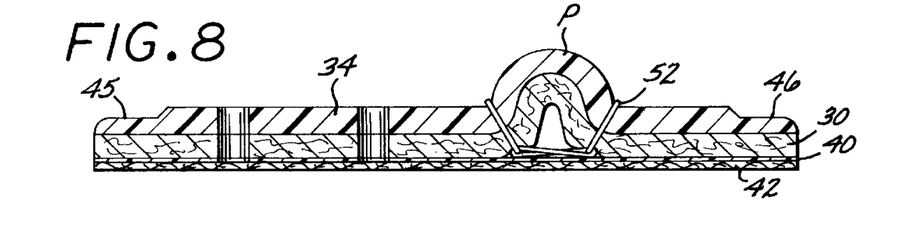
FIG. 8 is a vertical sectional view taken along line 8—8 of FIG. 7.

FIGS. 7 and 8 show how the protrusion P is formed in the strip S by a continuous thread T extending from the underside of the felt layer 30 over the outer surface of the polyurethane layer 34 along the length of the strip to cause the portion of the strip between the thread loops 52 to be bunched up relative to the original upper surface of the strip.

Figure 10:
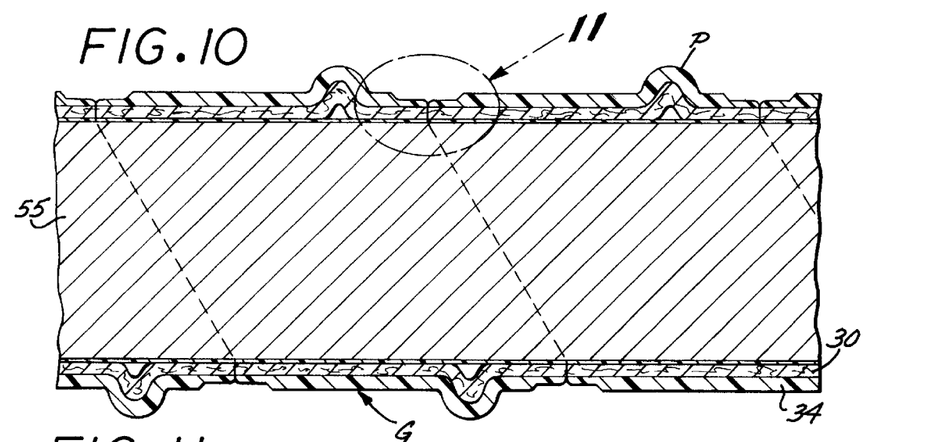
FIG. 10 is a vertical sectional view in enlarged scale taken along line 10—10 of FIG. 9.
Figure 12:
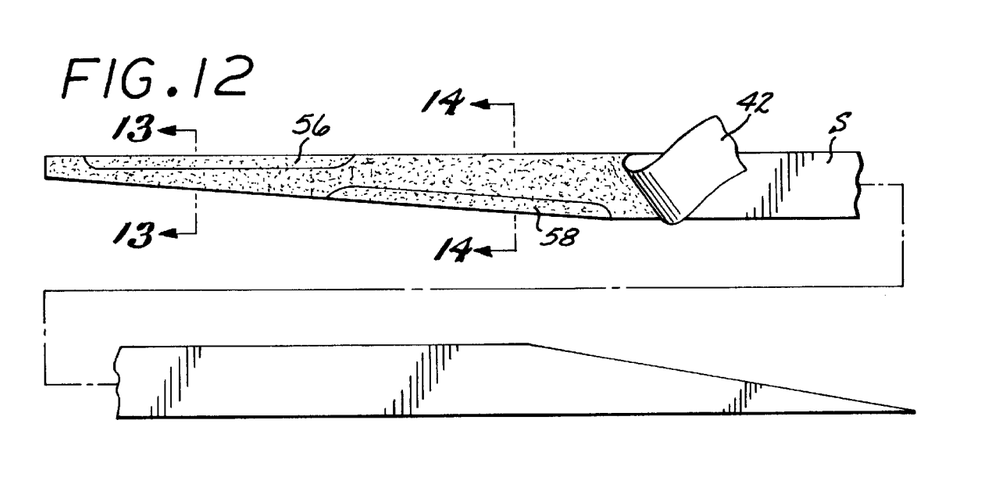
FIG. 12 is a horizontally exploded starting end of a second form of strip embodying the present invention.
Figure 13:
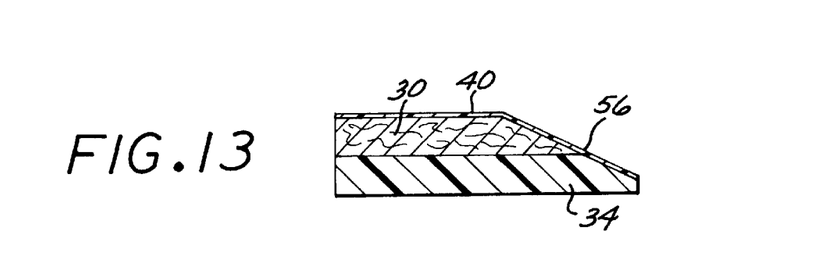
FIG. 13 is a vertical sectional view taken in enlarged scale along line 13—13 of FIG. 12.
Figure 14:
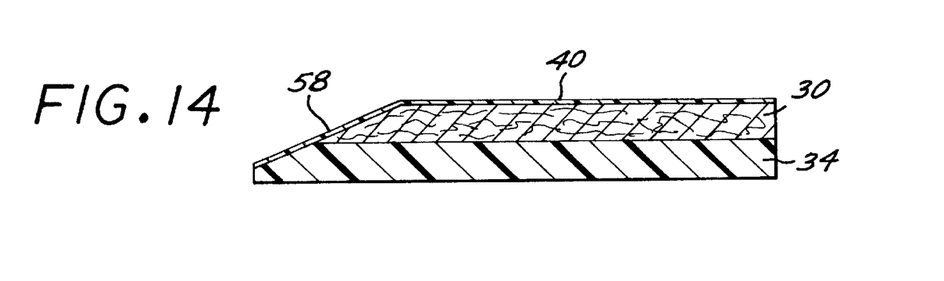
FIG. 14 is a vertical sectional view taken in enlarged scale along line 14—14 of FIG. 12.

Referring now to FIGS. 9, 10, and 11 to apply the strip S to a tennis racquet handle 55, the quick-release tape 42 is peeled off the adhesive 40 on the underside of the felt layer 30. The strip S is then spirally wound around the racquet handle starting with the butt end of the handle. The starting end 48 (relative to the racquet's butt end) may be provided with outwardly and downwardly slanted leading and trailing areas 56 and 58 (FIGS. 12, 13 and 14) on opposite edges of the strip, the rear portion of the leading area slightly overlapping the front portion of the trailing area. The provision of leading and trailing areas permits the strip to be initially wrapped about 1 ½ times around the butt end of the handle, with a smooth configuration of the strip resulting from the utilization of such slanted overlapped areas. As indicated in FIG. 10, the edges of the strip S do not overlap, and, instead, their radially extending surfaces butt tightly against one another, as shown at 60. It is important to note that the two abutting side edges of the strip afford a very firm contact between these side edges, since the polyurethane layer 34 is compressed by the heating platen P when the recessed reinforcing side edges are formed in the manner shown in FIGS. 2 and 6. Such compression increases the strength of the polyurethane material in the vicinity of the butt joint. Such firm contact would not be possible if the strip was formed solely of polyurethane, since polyurethane is quite soft as compared to felt. Tight abutment of the strip's side edges ensure that the strip does not unravel even when the grip is exposed to hard wear during play. If desired an adhesive (not shown) may be interposed between the abutting side edges, of the grip to further inhibit unraveling. As a result, the grip G is more durable and hence affords a longer service life than prior art grips. The provision of the recessed reinforcing side edges 45 and 46 further inhibits any tendency of the strip to unravel, enhances the appearance of the grip and improves the frictional contact of the user's hand and the racquet handle. Preferably, a length of conventional finishing tape (not shown) is wrapped about the end of the strip proximate the racquet head to secure the strip to the handle. Also, a rubber sleeve (not shown) may be utilized to cover the finishing tape so as to both enhance the appearance of the completed grip G and firmly secure the tape and strip to the racquet handle.

Figure 16:
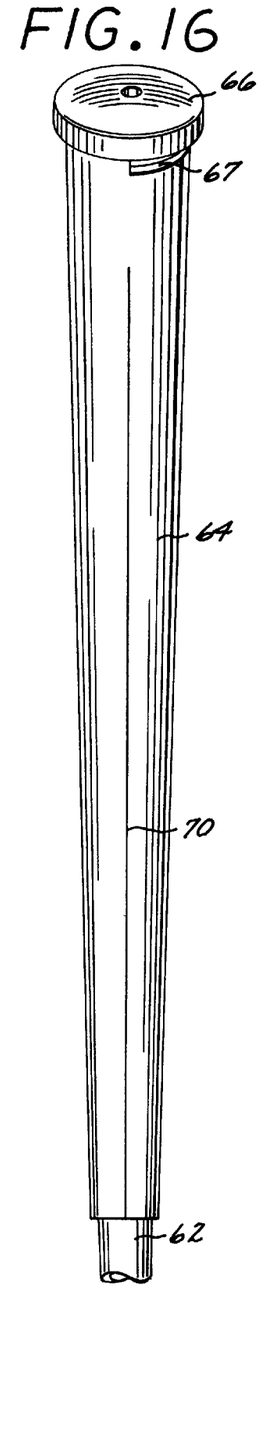
FIG. 16 is a perspective view showing a split tapered resilient sleeve applied to the handle of a golf club shaft to receive a strip embodying the present invention.
Figure 17:
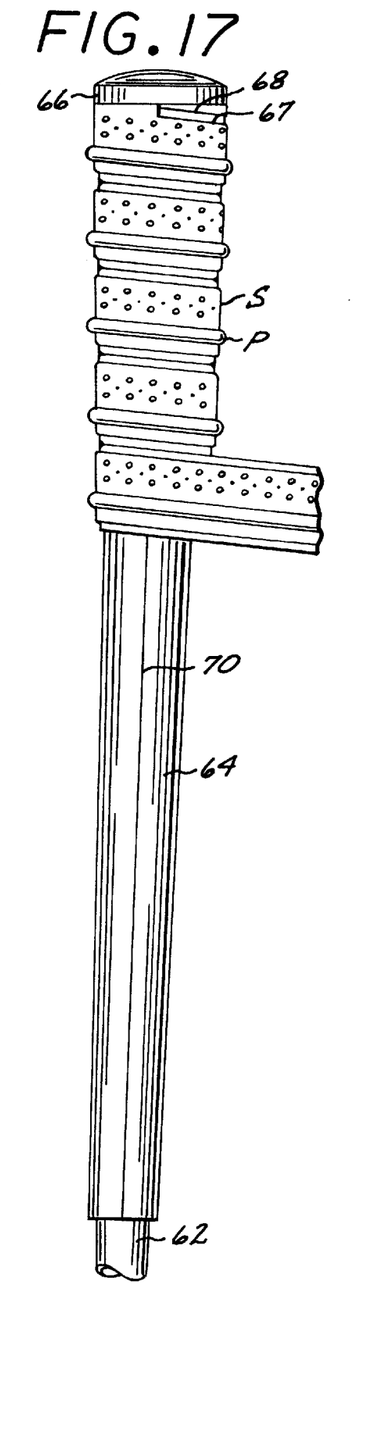
FIG. 17 is a side elevational view showing a strip embodying the present invention being wrapped about the sleeve of FIG. 16.
Figure 20:
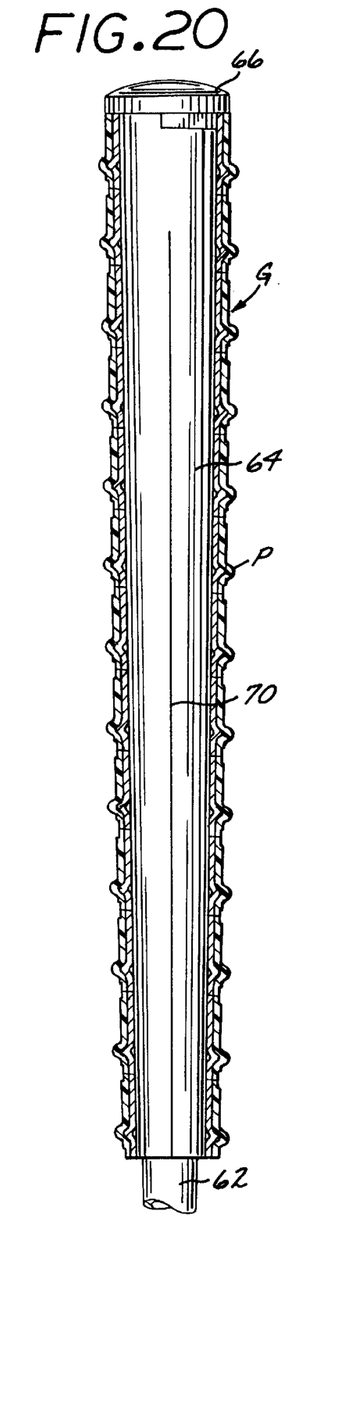
FIG. 20 is a cross-sectional view of the split tapered resilient sleeve of FIGS. 16 and 17 about which a strip embodying the present invention has been spirally wrapped.
Figure 21:
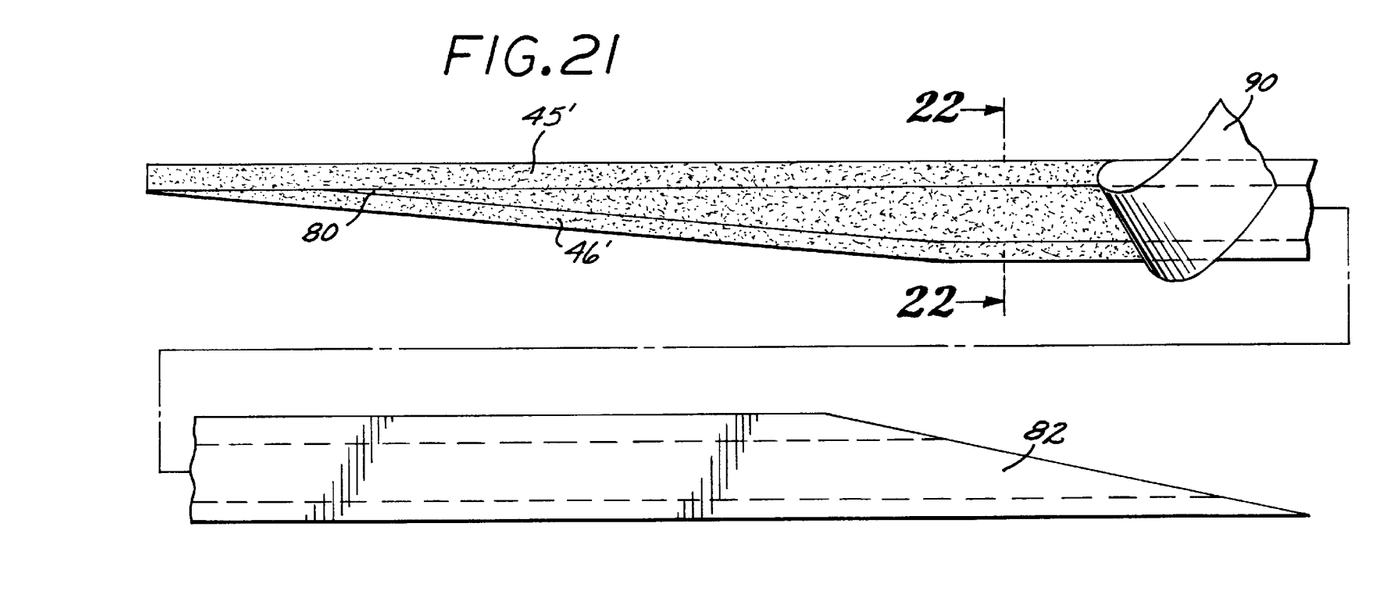
FIG. 21 is a horizontally expanded top plan view showing a third form of strip embodying the present invention.
Figure 22:
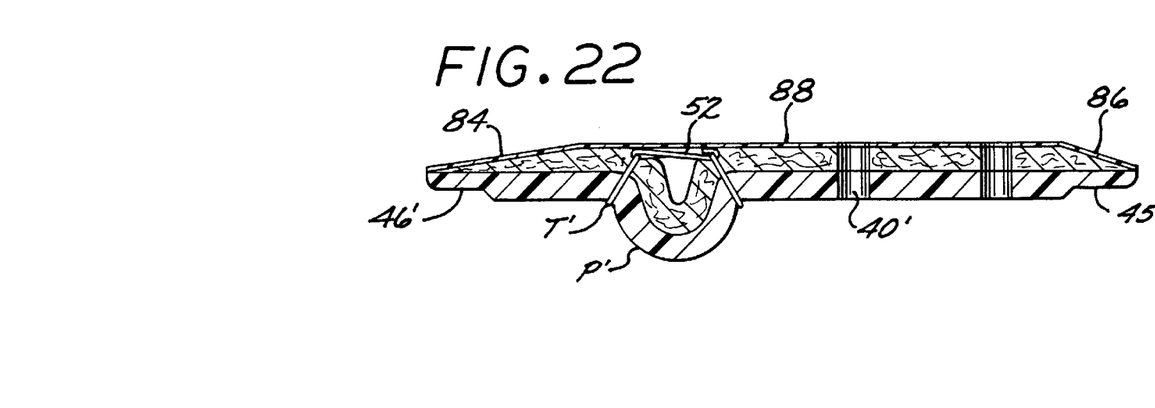
FIG. 22 is a vertical sectional view taken in enlarged scale along line 22—22 of FIG. 21.

Referring now to FIGS. 16, 17 and 20, there is shown a split sleeve 64 which may be utilized with the golf club grip embodying the present invention. Such sleeve may be unitiary synthetic plastic foam or rubber construction utilizing an integral cap 66 which is adapted to abut the upper end of the golf club handle shaft 62. The inner diameter of the sleeve 64 should be so selected as to effect a snug fit with the grip receiving portion of the golf club shaft handle when the sleeve is applied thereto. A recess 67 is formed in sleeve 60 to receive a tongue 68 formed on the starting edge of the strip. One side of the sleeve 60 is formed with a longitudinally extending slit 70. The sleeve is affixed to the golf club shaft hand as described in my U.S. Pat. No. 5,584,482. Thereafter, the strip S is spirally wrapped about the sleeve as described hereinbefore with the side edges of the strip in tight abutment.

Referring to FIG. 15, a strip S embodying the present invention is shown being spirally wrapped about the bare handle of a golf club shaft 62. In order to apply the strip S to the golf club shaft handle, the adhesive originally covered by the quick-release tape is peeled off the adhesive on the underside of the felt layer. The strip S embodying the present invention is then spirally wound around the shaft starting with the butt or top end of the shaft. The front of the starting end (relative to the shaft's butt end) of the strip fits snugly within a notch formed in the starting end of the strip so as to provide a smooth configuration of the strip relative to the exterior of the golf club shaft in the manner shown in my patent application Ser. No. 08/632,578, now U.S. Pat. No. 5,671,923. After the strip S has been completely wound about the shaft, its lower end may be secured in place by finishing tape (not shown) and/or a conventional resilient ferrule (not shown) to prevent unraveling of the lower portion of the strip relative to the shaft. The grip-receiving portion of the handle will may be flared radially outwardly at the upper portion of the shaft relative to the angle of flare of the shaft below such plane. This arrangement eliminates the need of an underlisting on such grip-receiving shaft portion, thereby effecting a weight reduction as compared to standard grips.

It should be noted that with a fixed shaft geometry (or size), the strip S can be made in different thicknesses to accommodate different golf grip sizes required by senior, small or large golfer's hands. A conventional cap (not shown) is secured to the upper end of the golf club shaft after the strip has been spirally wrapped therearound.

Figure 18:
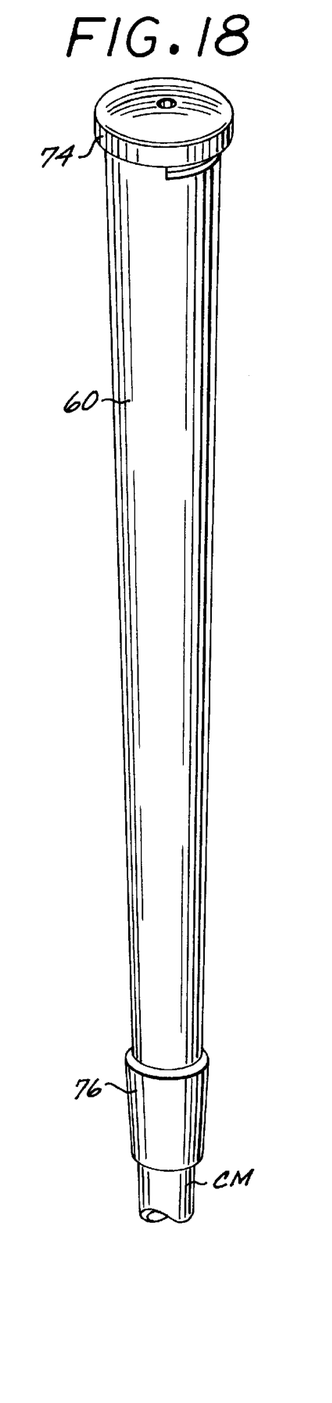
FIG. 18 is a perspective view of a second form of tapered resilient sleeve adapted to receive a strip embodying the present invention mounted upon a collapsible mandrel to receive a strip embodying the present invention.
Figure 19:
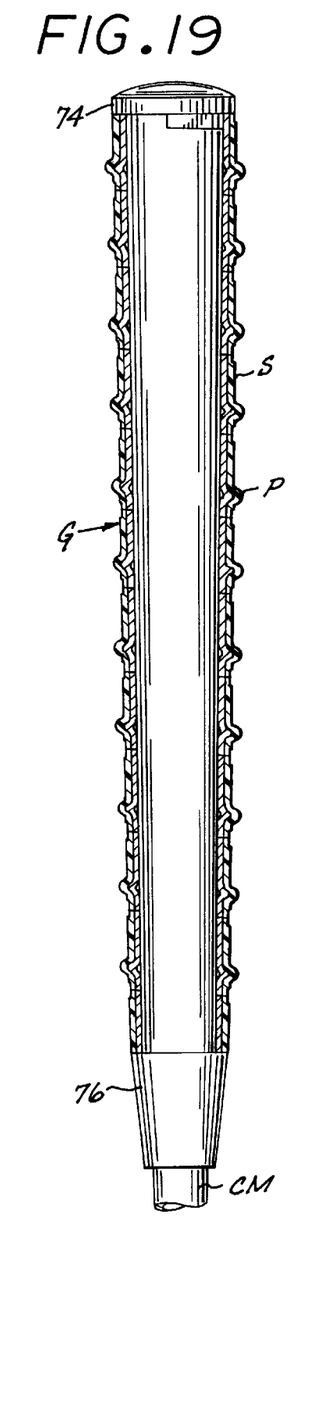
FIG. 19 is a side elevational view of the mandrel of FIG. 18 after a strip embodying the present invention has been spirally wrapped thereabout to form a slip-on grip.

Referring now to FIGS. 18 and 19, the aforedescribed strip S is shown wrapped around a resilient rubber-like sleeve, generally designated 72, of synthetic plastic foam or rubber construction utilizing a cap 74 to define a unitary, integral slip-on grip G embodying the present invention. The lower portion of sleeve is formed with a guide cylinder 76. A recess 77 is found below cap 76 to receive the front end of the strip. Sleeve S is adapted to be slipped over the top of a collapsible mandrel CM of conventional construction having a tapered configuration similar to the handle portion of a golf club shaft adapted to receive the grip. Mandrel CM is shown in outline FIGS. 18 and 19. Strip S is spirally wrapped about sleeve 60, as indicated in FIG. 19 with the reinforced edges of the strip disposed in tight abutment. An adhesive may secure the strip to the sleeve. The strip S extends from the underside of the cap 74 to the top of guide cylinder 76. The resulting assembly of sleeve and strip may be marketed as a replacement grip or as original equipment installed on a complete golf club. The recessed reinforcement side edges increase the strength of the butt joint between such edges, inhibit unraveling of the strip from sleeve, enhance the frictional contact between a golf s hands and the grip and provides an improved appearance over existing golf club grips. Moreover, such recessed reinforcement side edges reduce interference with other golf club grips when a golf club is removed from a golf bag so as to reduce wear and tear on such grips.

Referring now to FIGS. 21—25, there is shown another form of strip S' embodying the present invention. Strip S' utilizes heat compressed reinforcement side edges 45' and 46' of the type described hereinbefore, as well as protrusion P' formed by stitching T'.

After the reinforcement side edges have been formed in the polyurethane layer 34' the ends of the strip S' are cut to define tapered starting and trailing ends 80 and 82, respectively. The side edges of felt layer are skived to form outwardly and upwardly slanted side edges 84 and 86. Adhesive 88 is applied to the entire underside of the felt layer, such adhesive initially being covered in a conventional manner by the peel away tape 90. Preferably, slanted side edge 86 will be shorter than slanted side edge 84, e.g., side edge 86 may be about 2–3 mm, while side edge 84 may be about 5 mm.

Figure 23:
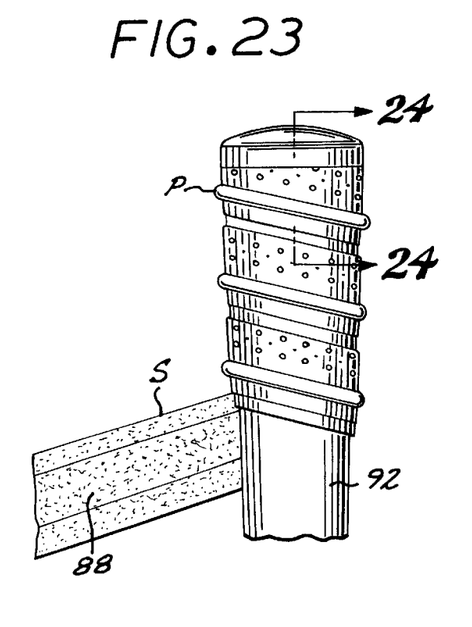
FIG. 23 is a broken side elevational view showing a strip of the type disclosed in FIGS. 21 and 22 being wrapped about a tapered resilient sleeve.
Figure 24:
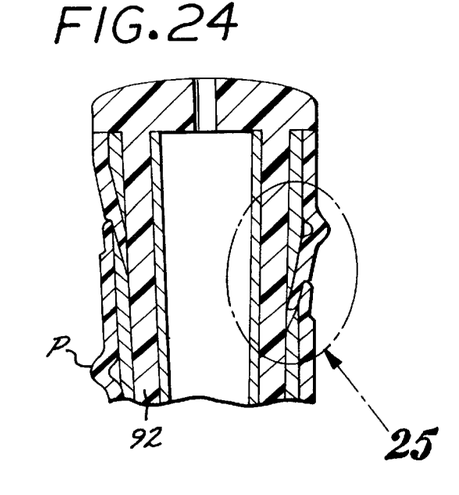
FIG. 24 is a vertical sectional view taken in enlarged scale along line 24—24 of FIG. 23.
Figure 25:
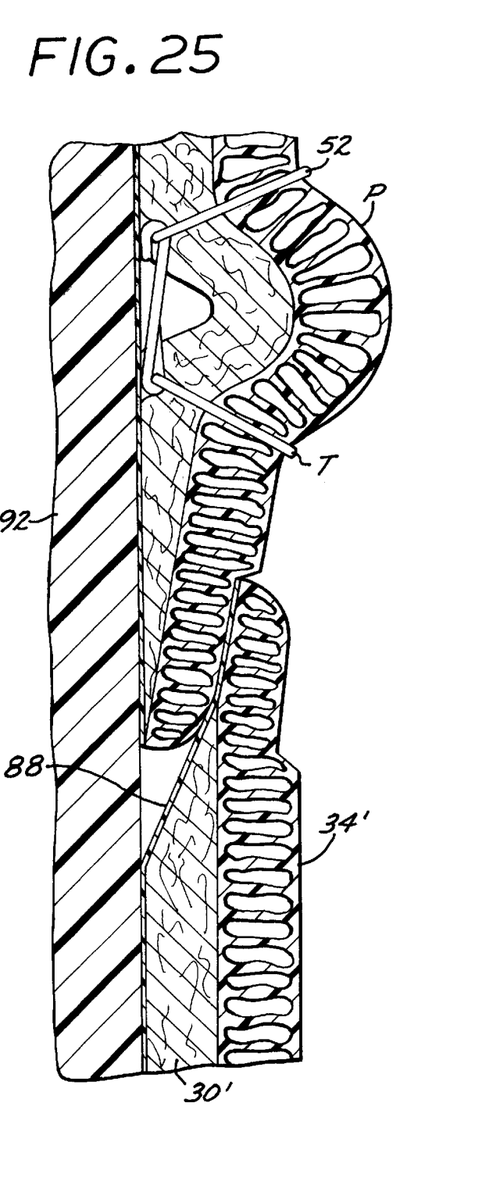
FIG. 25 is an enlarged view of the encircled area designated 25 in FIG. 24.

Referring now to FIGS. 23, 24 and 25, strip S' is shown being spirally wrapped about a tapered, resilient underlisting sleeve 92 which may be similar to those described hereinbefore. It is important to note the underside of the recessed side edges 45' and 46' of the polyurethane layer 34', overlap one another, with such edges preferably being secured together in a watertight manner by adhesive 88. The provision of the slanted side edges 84 and 86 of felt layer 30' permits such overlapping of the recessed side edges 45' and 46'. The use of slanted edges 84 and 86 having different widths permits a more pleasing longitudinal profile of the completed grip G while the narrower slanted side edge 86 reduces the amount of felt cut off the felt layer thereby maintaining the strength of the completed strip. Note that strip S' coulc be utilized with a bare golf club shaft handle rather than an underlisting sleeve.

It should be particularly noted that with each of the aforedescribed grips of the present invention the exterior surface of the polyurethane layer provides tackiness that assures a firm contact of the users hand with the grip at all times, even when the ball is not struck in the center portion of the racquet or golf club. This advantage can be enhanced by the provision of treads (not shown) or other slip inhibiting patterns formed on the surface of the polyurethane layer, pores and protrusion described hereinbefore. The use of the perforations not only increases absorption and allows for faster drying of the grip, but also further enhances a cushioning effect of the grip by providing a controlled restriction of air escaping from within the pores of the textile layer when the grip is grasped by the racquet user. It should also be noted that the grips S of the present invention are lighter in weight than conventional grips. Accordingly, more weight is distributed to the golf club head thereby increasing club head speed without increasing the weight of the golf club. Such weight savings moves the center of gravity of the golf club closer to the club head, increase the club's moment of inertia, and reduces the overall weight of the club and thereby permits a higher club head speed for greater distance. Less shaft twist is also achieved.

It will be apparent to those skilled in the art, that various modifications can be made without departing from the spirit and scope of the present invention. Accordingly, it is not intended that the invention be limited except by the appended claims.

I claim:

1. The combination of a handle for an impact imparting device and a shock absorbing resilient grip applied over such handle to conform to the external configuration of the handle, said combination comprising:

a strip which is spirally wrapped about said handle, the strip consisting of an open-pored felt layer having a generally flat inner surface abutting the handle and a smooth closed pore polyurethane layer having its inner surface bonded to the outer surface of the felt layer, with the pores of such polyurethane layer extending generally normal to the longitudinal axis of the strip, the thickness ratio of the polyurethane layer to the thickness of the textile layer being equal to or larger than approximately 0.18, and with the textile layer providing strength for the polyurethane layer while the polyurethane layer both absorbs shocks and provides tackiness so as to inhibit slippage of a user's hand relative to said handle;

stitching extending from the underside of the felt layer over the outer surface of the polyurethane layer to bunch up the portion of the strip between such stitching to define a slip-inhibiting protrusion;

an adhesive material applied over the inner surface of the felt layer; and the strip being spirally wrapped about the handle with the side edges in adjoining relationship and the protrusion defining a spiral profile along the length of the grip.

2. The combination of claim 1, wherein the polyurethane layer is about equal in thickness to the felt layer.

3. The combination of claim 1, wherein heat-compressed recessed reinforcing side edges are formed in the polyurethane layer along the length of the strip.

4. The combination of claim 3, wherein the side edges of the strip are in tight abutment and in firm contact with one another whereby the exterior surface of the strip is of smooth non-overlapping configuration and unraveling of the strip is inhibited.

5. The combination of claim 3 wherein the side edges of the strip are outwardly and downwardly slanted with their undersides overlapping one another.

6. The combination of claim 1, wherein the side edges of the strip are in tight abutment and in firm contact with one another whereby the exterior surface of the strip is of smooth non-overlapping configuration.

7. The combination of claim 1, wherein the side edges of the strip are outwardly and downwardly slanted with their undersides overlapping one another.

8. The combination as set forth in claim 1 wherein the strip is formed with air-passing perforations that enhance the rate of absorption of perspiration from a users' hands and also enhance the cushioning effect of the grip by controlling restriction of air escaping from within the grip when the grip is grasped by a user.

9. The combination of a handle of an impact imparting device the handle having a butt end, and a resilient grip, such combination comprising:

a strip which is spirally wrapped about said handle, the strip consisting of an open-pored felt layer having a generally flat inner surface abutting the handle and a smooth closed pore polyurethane layer having its inner surface bonded to the outer surface of the felt layer, with the pores of such polyurethane layer extending generally normal to the longitudinal axis of the strip, the thickness ratio of the polyurethane layer to the thickness of the textile layer being equal to or larger than approximately 0.18, and with the textile layer providing strength for the polyurethane layer while the polyurethane layer both absorbs shocks and provides tackiness so as to inhibit slippage of a user's hand relative to said handle;

stitching extending from the underside of the felt layer over the outer surface of the polyurethane layer to bunch up the portion of the strip between such stitching to define a slip-inhibiting protrusion;

an adhesive material applied over the inner surface of the felt layer;

the strip being spirally wrapped about the handle with the side edges in adjoining relationship and the protrusion defining a spiral profile along the length of the strip; and the starting end of the strip being formed with outwardly and downwardly slanted leading and trailing areas on opposite sides of such starting edge, the rear portion of the leading area overlapping the trailing area to provide a smooth configuration of the strip on the butt end of the handle.

10. The combination of claim 9, wherein the polyurethane layer is about equal in thickness to the felt layer.

11. The combination of claim 9, wherein heat-compressed recessed reinforcing side edges are formed in the polyurethane layer along the length of the strip.

12. The combination of claim 11, wherein the side edges of the strip are in tight abutment and in firm contact with one another whereby the exterior surface of the strip is of smooth non-overlapping configuration.

13. The combination of claim 11, wherein the side edges of the strip are outwardly and downwardly slanted with their undersides overlapping one another.

14. The combination as set forth in claim 11 wherein the strip is formed with air passing perforations that enhance the rate of absorption of perspiration from a users' hands and also enhance the cushioning effect of the grip by controlling restriction of air escaping from within the grip when the grip is grasped by a user.

15. A slip-on golf club shaft handle grip, comprising:

a strip consisting of an open-pored felt layer having an inner surface and an outer surface, and closed pore polyurethane layer having its inner surface bonded to the outer surface of the felt layer, with the pores of such polyurethane layer extending generally normal to the longitudinal axis of the strip, and with the textile layer providing strength for the polyurethane layer while the polyurethane layer both absorbs shocks and provides tackiness so as to inhibit slippage of a user's hand relative to the shaft;

stitching extending from the underside of the felt layer over the outer surface of the polyurethane layer to bunch up the portion of the strip between such stitching to define a slip-inhibiting protrusion;

a resilient sleeve, with the upper end of the sleeve being formed with a cap and the lower end of the sleeve being formed with a guide cylinder; and the strip being spirally wrapped about the sleeve between the bottom of the cap and the top of the guide cylinder with the protrusion defining a spiral profile along the length of the sleeve.

16. A slip-on golf club grip as set forth in claim 15 wherein the upper end of the sleeve below the cap is formed with a recess and the butt end of the strip is formed with a tongue, said tongue fitting snugly with the recess when the strip is wrapped about the sleeve to provide a smooth configuration of the strip relative to the sleeve.

17. The combination of claim 15, wherein heat-compressed recessed reinforcing side edges are formed in the polyurethane layer along the length of the strip.

18. The combination of claim 15, wherein the side edges of the strip are in tight abutment and in firm contact with one another whereby the exterior surface of the strip is of smooth non-overlapping configuration.

19. The combination of claim 15, wherein the side edges of the strip are outwardly and downwardly slanted with their undersides overlapping one another.

20. The combination as set forth in claim 15 wherein the strip is formed with air-passing perforations that enhance the rate of absorption of perspiration from a users' hands and also enhance the cushioning effect of the grip by controlling restriction of air escaping from within the grip when the grip is grasped by a user.

21. In the combination of a golf club shaft handle, a tapered resilient sleeve for said handle, such sleeve being formed at its upper end with a cap below which is formed a recess:

a strip which is spirally wrapped about said handle, the strip consisting of an open-pored felt layer having a generally flat inner surface abutting the handle and a smooth closed pore polyurethane layer having its inner surface bonded to the outer surface of the felt layer, with the pore of such polyurethane layer extending generally normal to the longitudinal axis of the strip, the thickness ratio of the polyurethane layer to the thickness of the textile layer being equal to or larger than approximately 0.18, and with the textile layer providing strength for the polyurethane layer while the polyurethane layer both absorbs shocks and provides tackiness os as to inhibit slippage of a user's hand relative to said handle;

stitching extending from the underside of the felt layer over the outer surface of the polyurethane layer to bunch up the portion of the strip between such stitching to define a slip-inhibiting protrusion;

the strip being spirally wrapped about the sleeve between the bottom of the cap and the lower portion of the sleeve with the protrusion defining a spiral profile along the length of the grip; and the butt end of the strip being formed with a tongue that fits snugly within said recess when the strip is wrapped about the sleeve to provide a smooth configuration of the strip relative to the sleeve.

22. The combination as set forth in claim 21 wherein heat-compressed recessed reinforcing side edges are formed in the polyurethane layer along the length of the strip.

23. The combination as set forth in claim 21 wherein the strip is formed with air-passing perforations that enhance the rate of absorption of perspiration from a users' hands and also enhance the cushioning effect of the grip by controlling restriction of air escaping from within the grip when the grip is grasped by a user.

24. The combination of a handle for an impact imparting device and a shock absorbing resilient grip applied over such handle to conform to the external configuration of the handle, said combination comprising:

a strip which is spirally wrapped about said handle, the strip consisting of an open-pored felt layer having a generally flat inner surface abutting the handle and a smooth closed pore polyurethane layer having its inner surface bonded to the outer surface of the felt layer, with the pores of such polyurethane layer extending generally normal to the longitudinal axis of the strip, the thickness ratio of the polyurethane layer to the thickness of the textile layer being equal to or larger than approximately 0.18, and with the textile layer providing strength for the polyurethane layer while the polyurethane layer both absorbs shocks and provides tackiness so as to inhibit slippage of a user's hand relative to said handle;

a slip-inhibiting protrusion formed on the strip along the length thereof;

heat-compressed recessed reinforcing side edges formed along the length of the polyurethane layer;

an adhesive material applied over the inner surface of the strip; and the strip being spirally wrapped about the handle with the side edges in adjoining relationship and the protrusion defining a spiral profile along the length of the grip.

25. The combination of claim 24, wherein the polyurethane layer is about equal in thickness to the felt layer.

26. The combination of claim 24, wherein the side edges of the strip are in tight abutment and in firm contact with one another whereby the exterior surface of the strip is of smooth non-overlapping configuration.

27. The combination of claim 24, wherein the side edges of the strip are outwardly and downwardly slanted with their undersides overlapping one another.

28. The combination as set forth in claim 24 wherein the strip is formed with air-passing perforations that enhance the rate of absorption of perspiration from a users' hands.

29. The combination of a handle for an impact imparting device and a shock absorbing resilient grip applied over such handle to conform to the external configuration of the handle, said combination comprising:

a strip which is spirally wrapped about said handle, the strip consisting of an open-pored felt layer having a generally flat inner surface abutting the handle and a smooth closed pore polyurethane layer having its inner surface bonded to the outer surface of the felt layer, with the pores of such polyurethane layer extending generally normal to the longitudinal axis of the strip, and with the textile layer providing strength for the polyurethane layer while the polyurethane layer both absorbs shocks and provides tackiness so as to inhibit slippage of a user's hand relative to said handle;

stitching extending from the underside of the felt layer over the outer surface of the polyurethane layer to bunch up the portion of the strip between such stitching to define a slip-inhibiting protrusion;

an adhesive material applied over the inner surface of the strip; and the strip being spirally wrapped about the handle with the side edges in adjoining relationship and the protrusion defining a spiral profile along the length of the grip.

30. The combination of a handle for an impact imparting device and a shock absorbing resilient grip applied over such handle to conform to the external configuration of the handle, said combination comprising:

a strip which is spirally wrapped about said handle, the strip consisting of an open-pored felt layer having a generally flat inner surface abutting the handle and a smooth closed pore polyurethane layer having its inner surface bonded to the outer surface of the felt layer, with the pores of such polyurethane layer extending generally normal to the longitudinal axis of the strip and with the textile layer providing strength for the polyurethane layer while the polyurethane layer both absorbs shocks and provides tackiness so as to inhibit slippage of a user's hand relative to said handle;

a slip-inhibiting protrusion formed on the strip along the length thereof;

heat-compressed recessed reinforcing side edges formed along the length of the polyurethane layer;

an adhesive material applied over the inner surface of the strip; and the strip being spirally wrapped about the handle with the side edges in adjoining relationship and the protrusion defining a spiral profile along the length of the grip.

31. The combination of claim 30, wherein the side edges of the strip are in tight abutment and in firm contact with one another whereby the exterior surface of the strip is of smooth non-overlapping configuration.

32. The combination of claim 30, wherein the side edges of the strip are outwardly and downwardly slanted with their undersides overlapping one another.

\* \* \* \* \*